United States Patent

Björsne

(10) Patent No.: US 7,373,552 B2
(45) Date of Patent: May 13, 2008

(54) MODEL BASED DIAGNOSIS AND REPAIR FOR EVENT LOGS

(75) Inventor: Tord Björsne, Dietenhofen (DE)

(73) Assignee: Siemens Aktiengesellschaft, Munich (DE)

(*) Notice: Subject to any disclaimer, the term of this patent is extended or adjusted under 35 U.S.C. 154(b) by 602 days.

(21) Appl. No.: 10/955,290

(22) Filed: Sep. 30, 2004

(65) Prior Publication Data

US 2006/0085689 A1    Apr. 20, 2006

(51) Int. Cl.
*G06F 11/00* (2006.01)

(52) U.S. Cl. ....................................................... 714/37

(58) Field of Classification Search ................... 714/25, 714/27, 37, 39, 38, 26; 324/731
See application file for complete search history.

(56) References Cited

U.S. PATENT DOCUMENTS

| | | | |
|---|---|---|---|
| 4,881,230 A | 11/1989 | Clark et al. | |
| 4,972,453 A | 11/1990 | Daniel, III et al. | |
| 5,127,012 A | 6/1992 | Hiliger | |
| 5,293,556 A | 3/1994 | Hill et al. | |
| 5,544,308 A * | 8/1996 | Giordano et al. | 714/26 |
| 5,675,724 A | 10/1997 | Beal et al. | |
| 5,712,896 A | 1/1998 | Lee et al. | |
| 5,847,972 A | 12/1998 | Eick et al. | |
| 5,922,079 A * | 7/1999 | Booth et al. | 714/26 |
| 6,473,659 B1 | 10/2002 | Shah et al. | |
| 6,609,217 B1 | 8/2003 | Bonissone et al. | |
| 6,691,249 B1 * | 2/2004 | Barford et al. | 714/25 |
| 2003/0018619 A1 | 1/2003 | Bae et al. | |
| 2003/0126501 A1 * | 7/2003 | Musman | 714/26 |
| 2004/0059966 A1 * | 3/2004 | Chan et al. | 714/48 |
| 2004/0153819 A1 | 8/2004 | Bjorsne et al. | |
| 2005/0172162 A1 | 8/2005 | Takahashi et al. | |

FOREIGN PATENT DOCUMENTS

| | | |
|---|---|---|
| DE | 102 44 131 A1 | 4/2004 |
| EP | 1 577 783 A1 | 9/2005 |

OTHER PUBLICATIONS

David Heckerman □□ A tutorial on learning with Bayesian Networks □□ Mar. 1995 (Revised 1996) □□ Microsoft□□ Technical Report, pp. 1-2 □□ MSR-TR-95-06.*

* cited by examiner

*Primary Examiner*—Dieu-Minh Le
(74) *Attorney, Agent, or Firm*—Schiff Hardin LLP

(57) ABSTRACT

A system and appertaining method isolates a hardware or user error in a software controlled apparatus e.g., an NMR-apparatus. A diagnostic function is added to an event log that uses a causality model to analyze the event log. A series of events in the event log is evaluated by comparing the events with at least one of a number of root cause related patterns, and a best match of these patterns is used to assign a root cause for the error. Various repair actions may be associated based on a probabilistic model. Additional information may be utilized to modify or improve respective probabilities associated with causes and/or repair actions. This additional information may utilize other automated diagnostic information or may query users for additional information.

14 Claims, 6 Drawing Sheets

MODEL BASED DIAGNOSIS AND REPAIR FOR EVENT LOGS

BACKGROUND

Software systems comprising various components frequently utilize log databases to track system and component operation for diagnostic purposes. An "event log" may be used to chronologically stores events that are generated by different software components in the system. Software components may generate events as responses to certain combinations of their internal state and stimuli from, for example, other software modules, the hardware, or the user.

The logged events typically fall into one of three categories: "Error Events" are generated when errors are found or exceptional or unexpected things occur; "Success Events" are generated as information indicating that aspects of the system are running properly; and "Information Events" are generated as information indicating that certain informational things occur.

Event can further more be assigned a severity level. Different Error Events may, for example, have different severity levels. The Success Events and the Information Events are usually indicated as having a lower severity level than the Error Events.

The event log can be broken down as having different access levels as well. For example, only system administrators may have access to certain secure logs ("Internal Event Log") or sections of the log or events (e.g., security violations, etc.), whereas software component users may have access to various logs ("User Event Log") or log sections pertaining to operation of the respective software component.

For the user, the User Event Log shows a filtered version of the Internal Event Log. The purpose of filtering the Internal Event Log is to avoid showing irrelevant and redundant information to the user. The User Event Log only shows events with a particular criticality level (this level being a configurable level). Events are displayed in the User Event Log until the user acknowledges them. The user interface may show a special icon as long as the User Event Log contains at least one unacknowledged event. The User Event Log shows the filtered events in reverse chronological order, so that the most recent one is displayed at the top in a list. Using a separate user interface, the user can view the complete User Event Log, that is, the user log that also includes the acknowledged events. Events in the User Event Log can be automatically acknowledged when Success Events are received.

Both the Internal Event Log (for systems personnel) and the User Event Log (for users) are provided to help diagnose problems in the system.

The problem with such log files, however, is that the User Event Log shows too many events or not the most relevant ones. Each significant problem that interests the user may generate more than one event. Because the events are shown chronologically, the most important ones are not necessarily at the top.

Furthermore, on such systems, the explanatory text shown for each event may describe the cause for the problem, but the event cause text is static and is not influenced by other events. Some events may have different causes. Because the explanation is static, it then must either describe all possibilities, or else omit some or all causes. This can be confusing, especially when multiple events are present in the User Event Log because of conflicting, redundant, or insufficient information.

The explaining text shown for each event may describe an appropriate repair action to solve the problem. The problem is that the event action text is static and not influenced by other events. For some events, it may not be possible to specify a single repair action because the appropriate repair actions depends on additional information. Since the explanation is static, it then must describe all possibilities, or omit some or all repair actions. This too can be confusing, especially when multiple events are present in the User Event Log because of conflicting, redundant, or insufficient instructions.

Software that automatically performs repair actions is lacking. Some problems can be repaired with software programs. Such repair actions could be performed automatically if a diagnosis can be automatically found, or perhaps allowed to run when acknowledged by the user.

Software is needed that tries to diagnose by analysing multiple events. Some problems can only be conclusively diagnosed by considering more than one event or additional information.

The Internal Event Log does not always contain enough information for a conclusive diagnosis. It would be useful if also other information sources could be used for diagnostic purposes. Such information sources could be log files, data or program module state information.

In some cases additional information necessary for a conclusive diagnosis could be collected automatically by calling test functions. This possibility does not presently exist. The technical problem is to find out when such test functions should be called. For performance reasons, it is not reasonable to execute them e.g., for each received event.

Necessary information for a conclusive diagnosis is not always possible to collect automatically without intervention from the user. Some things can only, or easiest, be checked by the user. The diagnostic capability of the system could be improved if the diagnosis software would prompt for or accept manual test results.

Some of the Wizards in modern Microsoft products are an example of efficient diagnostic tools. The user is guided through a series of dialogs that serves to collect information and home in on the problem cause.

It is known to have event logs where events are classified by severity and the most severe ones are shown at the top of a list. Usually they can be acknowledged and are then moved to a history list for later analysis, when required.

SUMMARY OF THE INVENTION

The aim of the invention is the isolation of a hardware or user error in a software controlled apparatus e.g., an NMR-apparatus. The invention achieves this aim and solves the previously described problems by adding a diagnostic function to the User Event Log. The invention can either replace the filtering between the Internal Event Log and the User Event Log, or it can be used in addition to the User Event Log.

An analysis of information sources is performed: the event log history is searched for patterns; additionally, questions/tests give further information for extended patterns; additionally, repair actions are suggested.

An optional embodiment of the invention adds the capability of questioning the user for manual test results, or accepting manual test results, depending on a realization method. Another embodiment of the invention allows the diagnostic function to automatically call test functions to collect more information necessary for a conclusive diagnosis. A further embodiment of the invention is to allow the diagnostic function to automatically call repair actions to solve the problem.

This approach is advantageously applicable to a broad spectrum of technical equipment. The only prerequisite is that the system software generates events and stores them in an event log. The invention is especially suited for medical systems software. It can be integrated into existing software with little effort; the required software is small and can be implemented in a separate software module. The change to the user interface is small and isolated to the Event Log. It is controlled by a model that is easy to update. Because no change to program code is needed, it is viable to distribute updated models to customer systems, including when these systems involve medical equipment. It is viable to update the models from remote locations making it possible to quickly and cheaply distribute improvements over the whole world.

This system may also be useful also with incomplete models, and could even work with an empty model; the diagnostic capability would then degrade to the stand of a pure event log as if the invention was not used. The quality of diagnosis can be incrementally improved by extending the model. As experience grows with the use of the system, the model can be extended to improve the diagnostic capabilities.

DESCRIPTION OF THE DRAWINGS

The invention is explained in more detail referencing various embodiment depicted in the drawings and described in more detail below.

DETAILED DESCRIPTION OF THE PREFERRED EMBODIMENTS

Figure 1:
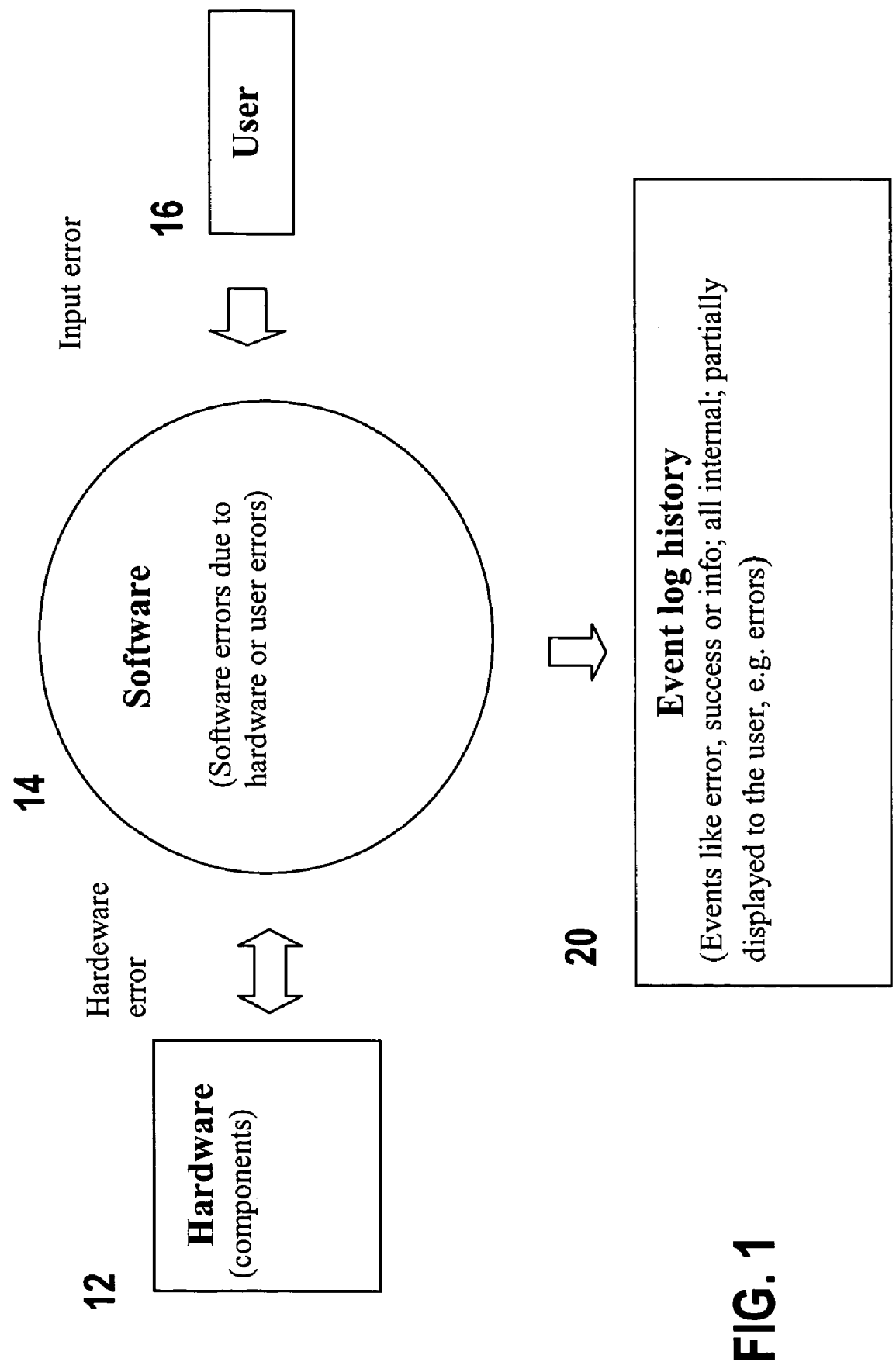
FIG. 1 is a block diagram illustrating major system components.

FIG. 1 illustrates the major components involved in embodiments of the invention. The system comprises both hardware components 12 and software components 14. Events related to the hardware 12, software 14, and user 16 activities are stored in an event log 20. In the known systems, the event log history 20 is displayed partially (filtered) to the user 16, but there is almost no intelligence in the accompanying filter, with the exception that if an error is later corrected and a success event is generated, the former error will not be displayed any longer.

The following terms are defined as follows, with reference to the Figures for reference characters.

| Term | Definition |
|---|---|
| Root cause (diagnosis d1) | A defect hardware component or wrong user input. |
| Root cause related pattern (event sequence, en1) | The root cause will cause a series of events (error, info, etc.); this series is more or less directly related to the root cause; it can include logical operations on events. Example pattern: error1 OR error2; at least three times, then error3; "answer question1: component1 does not respond"; then error4; info1, etc. |
| Extended pattern | Further information might narrow the root cause search, therefore: a) "questions" can be asked that the user can answer (correct plugged plug, etc.); and b) "tests (t1)" can be done that concern the functionality of the hardware (see e.g., U.S. Patent Application Ser. No. 2004/0153819, herein incorporated by reference); this information adds to the root cause related pattern. |
| Repair action (r1) | An isolated error can be fixed by a repair action like "plug in again", "input correct parameter again", "call service", etc. |
| Probabilistic relations | These are relations, e.g., between a root cause and pattern or pattern and repair action; positive probability –> directly connected, negative probability –> exclusively connected; realized by Bayesian Network implementation (see e.g., U.S. Patent Application No. Ser. 2004/0153819). |

Figure 2:
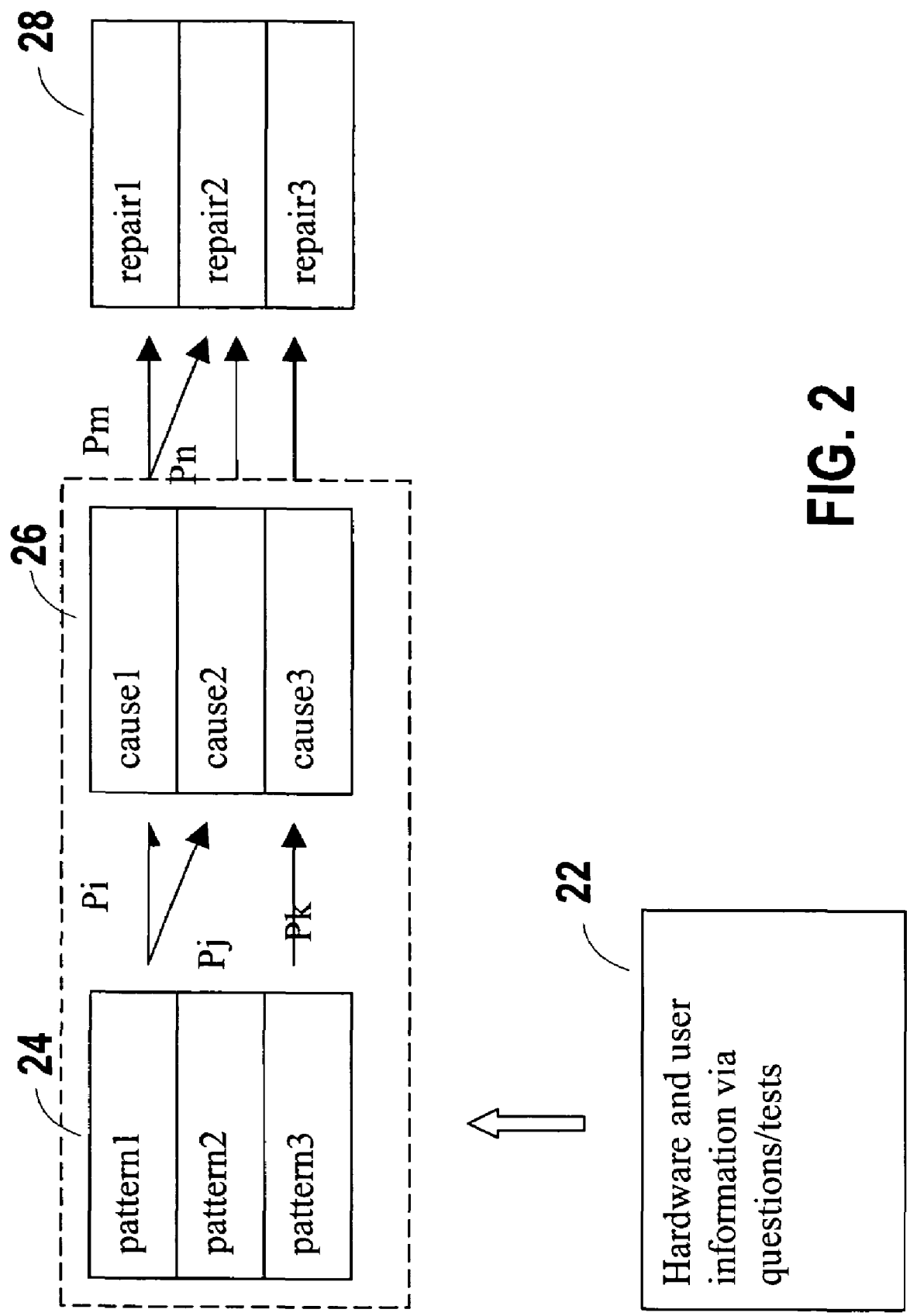
FIG. 2 is a block diagram showing the relationship between patterns, causes and repairs.

A "causality model" (FIG. 2) is used which relates "root causes" 26 (cause1, cause2, cause3) to "(extended) root cause related patterns" 24 (pattern1, pattern2, pattern3). To isolate a "root cause" 26, the event log history 20 is matched onto the patterns 24. Probabilities Pi-Pn are evaluated and additional "questions" are asked of the user 16 to focus the search down as much as possible. Information received from the hardware and user based on questions and tests 22 is provided to make the determination. Finally "repair actions" 28 (repair1, repair2, repair3) can be suggested based on the information received 22, patterns 24, causes 26 and probabilities Pi-Pn.

Example queries for the user, which preferably comprise yes/no questions, could include, "did you plug Connector A into Port B?" or "did you position the device correctly during the tune up?".

Hardware tests may be performed (e.g., out of a test model as described in U.S. Patent Application No. 2004/0153819) that include software test routines that: 1) result in yes/no answers, or 2) extract further information out of other log-files that relate to and describe the running system.

Simple events in the event history may form a pattern when coupled together with responses to a few questions. For example, a local coil error pattern can be mixed with all kinds of different events in the event log history, e.g., 1) "Do not know coil"—an error event in software layer A; 2) "Can not measure"—an error event in software layer B; 3) "Measurement stopped by NMR-Scanner"—an error event in (a top) software layer C. In this example, a filtered error event ispresented to user: "local coil error—local coil not detectable". The possible reasons are: the local coil is: a) broken; b) badly connected; c) not yet known to the system (a new coil of the supplier).

A possible test to determine whether the coil is connected, broken, etc. might be a "voltage test". Questions could include: 1) "Did you plug the coil in"? (to which a yes/no response would be requested); 2) "Is this a standard (Brand X) coil?" (to which a "yes" response might invoke the repair action "call service" and a "no" response might invoke the repair action, "install a new coil".

A more detailed description follows. Various embodiments of the invention described below have two parts: a data model and an algorithm. The data model stores information that is specific for a certain system. The algorithm is on the other hand generic and remains the same on all systems.

Data Model

The data model is a network model with four major node types: event sequences, tests, diagnosis, and repair actions. The edges of the network model describe dependencies between the nodes. The relevant dependencies are: event-diagnosis dependencies, test-diagnosis dependencies, and diagnosis-repair dependencies.

An event sequence node represents an expression that is evaluated to true (1) or false (0). An especially suited expression type usable for the invention is "regular expressions". Regular expressions evaluate to true when and only when the sequence of events in the Internal Event Log can be matched to the pattern of the expression. Regular expressions can be evaluated very efficiently. The event sequence node expressions evaluate to true as soon as the first event is received that completes the pattern of the regular expression. Normally the regular expression is formulated so that it evaluates to false again as soon as another event is received, for example, a success event. In an embodiment of the invention the regular expression could be extended to handle also time constraints between events.

In an embodiment of the invention other information sources can also be evaluated in event sequence nodes. Such sources of information are, for example other forms of log files that the system maintains, configuration files, and databases.

The test node represents tests that can be performed to collect information improving the possibility for a decisive diagnosis. Test nodes can be said to have an expression that, similar to the event sequence nodes, evaluates to true (1) or false (0). "True" means that the test was positive and "false" means that the test was negative. There are two main types of tests: manual and automatic. Manual tests consist of a question to the user that can be answered by "yes" or "no". Depending on the context, one must specify which answer corresponds to a positive test result. The automatic tests can be performed by the system itself without interaction with the user.

In an embodiment of the invention, the event sequence node expression and the test node expression could be evaluated to a value between zero and one expressing the degree of belief that the expression is "true". A value close to one is then "almost true" and a value close to zero "almost false". The value could be interpreted as the probability that the event sequence node is true.

The diagnosis node contains a textual description specifying what is wrong when the diagnosis is correct. Whether a diagnosis is correct or not is evaluated using the event-diagnosis and the test-diagnosis dependencies. The result is a value between zero and one, which can be interpreted as the probability than the diagnosis is correct. Event-diagnosis and test-diagnosis dependencies each have two properties that go into the evaluation. The first property is the "polarity" of the dependency, that is, if the result from evaluating an event node or test node should be inverted or not. The second property is the weight of the dependency. In some implementations of the invention (using a Bayesian Network), the weight can be interpreted as the probability that the event node or test node evaluates to true (first taking the polarity into account) when the diagnosis is correct. In this case, the weight must be between zero and one. There is usually more than one event-diagnosis and test-diagnosis dependency for each diagnosis.

The repair node represents an action that is believed to cure the problem described by a diagnosis node. There are two main types of repair nodes, manual and automatic. The manual repair node is a textual description specifying what to do to correct the problem. The automatic repair node represents a function that can be executed by the system to automatically correct the problem. The diagnosis-repair dependency has a weight property. In some implementations of the invention, the weight can be interpreted as the probability that the repair node represents the correct way to cure the problem described by the diagnosis. One repair node may be the cure for more than one diagnosis.

Algorithm

Figure 6:
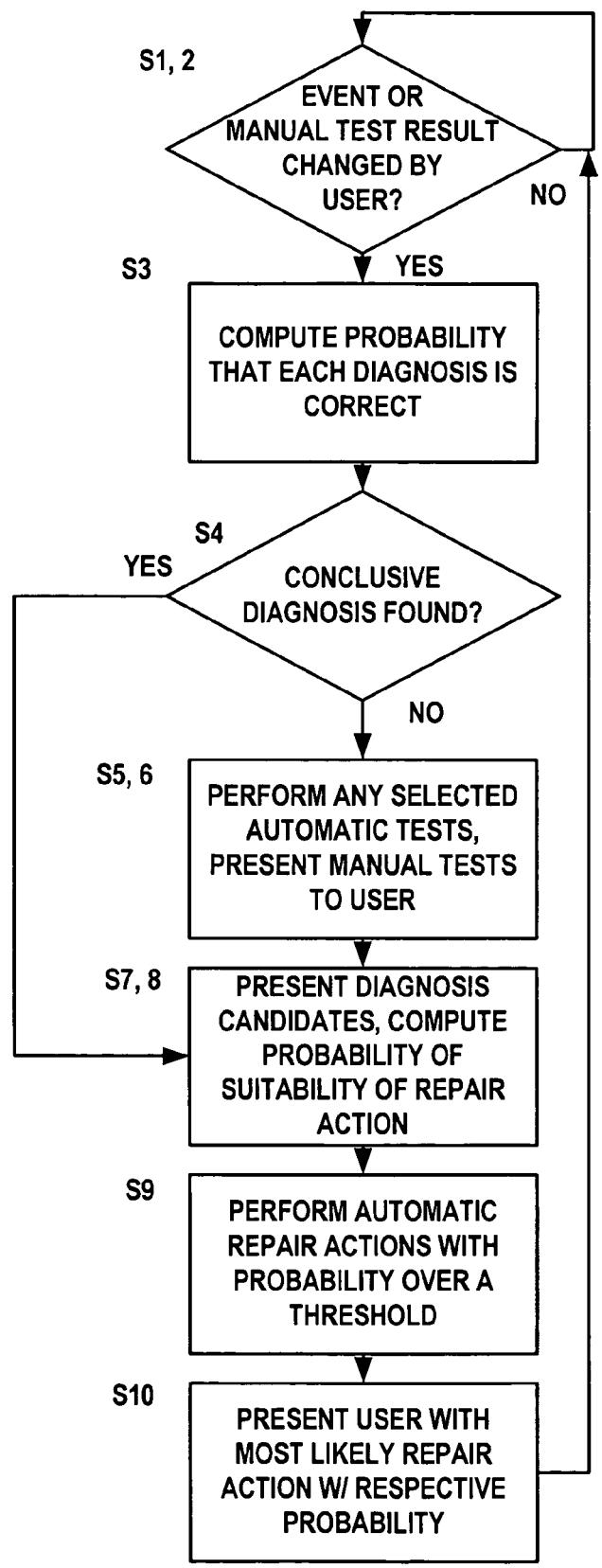
FIG. 6 is a flowchart illustrating an embodiment of the invention.

The algorithm for the invention can be described by a flow diagram, as illustrated by FIG. 6. In a step S1, the algorithm waits (e.g., looping or asynchronous) for next event or until a manual test result is changed by the user. In a step S2, if the new event causes any event sequence node to change value, or if a manual test result was changed, then the next step S3 is executed, otherwise the algorithm returns to step S1.

In step S3, the algorithm computes the probability that each of the diagnosis is correct. An especially suited method for this is the Bayesian Network model. In a step S4, if a single conclusive diagnosis cannot be found, the algorithm looks for unanswered tests for the diagnosis candidates, otherwise, the algorithm goes to step S7.

In a step S5, the algorithm performs any selected automatic tests, and in a step S6, it presents to the user the manual tests that are most likely to differentiate between the diagnosis candidates.

In a step S7, the algorithm presents to the user the diagnosis candidates, possibly with their respective probability. In a step S8, the algorithm computes the probability that each of the repair actions is suitable. In a step S9, the algorithm performs all automatic repair actions with a probability over a particular threshold. In a step S10, the algorithm presents to the user the most likely repair action, possibly with their respective probability. The entire process is then repeated.

Various embodiments of the above-described invention are best illustrated by way of example.

Figure 3:
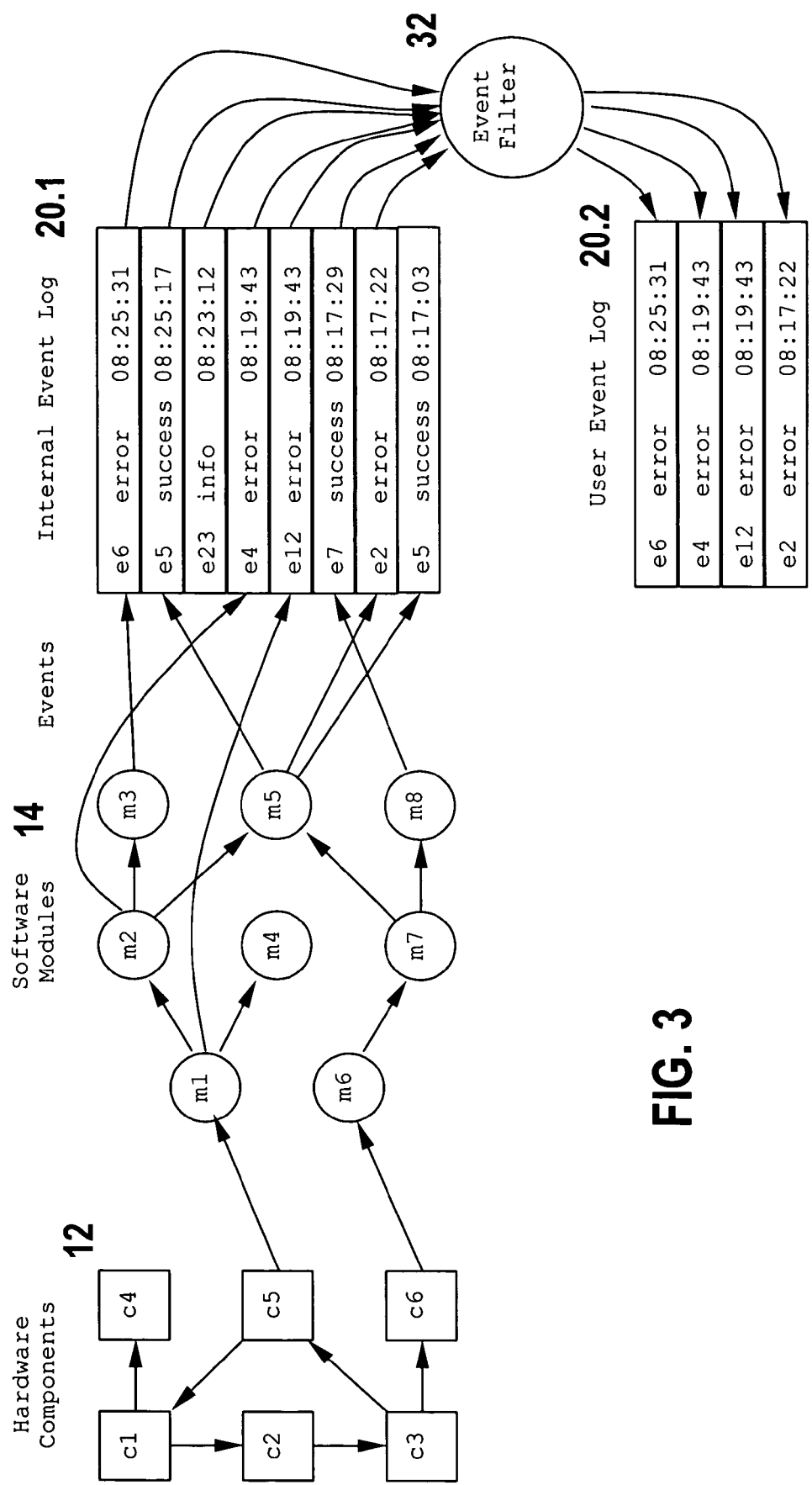
FIG. 3 is a block diagram illustrating the flow of events through the system.

FIG. 3 shows an example of how events are generated and handled in the system. Events are generated by software modules 14 (m1, m2, m3, m5, m8) and stored chronologically in the internal event log 20.1. Because of the software structure, a single problem may cause multiple events. If, for example, there is a problem originating from the hardware component c1 (detected through c5) this could first be detected by the software module m1 that generates the event e12. The software module m2 depends on the result from m1 and, given the problem, cannot do its work; therefore, module m2 then generates event e4. Likewise, software module m3 depends on the result from module m2 and, given the problem, generates event e6. All of these events are stored in the internal event log 20.1.

The event filter 32 filters the events before they are provided to the User Event Log 20.2. As illustrated in FIG. 3, the filter 32 first of all only lets through error events. Secondly, the error event e2 was automatically confirmed by the success event e5.

Figure 4:
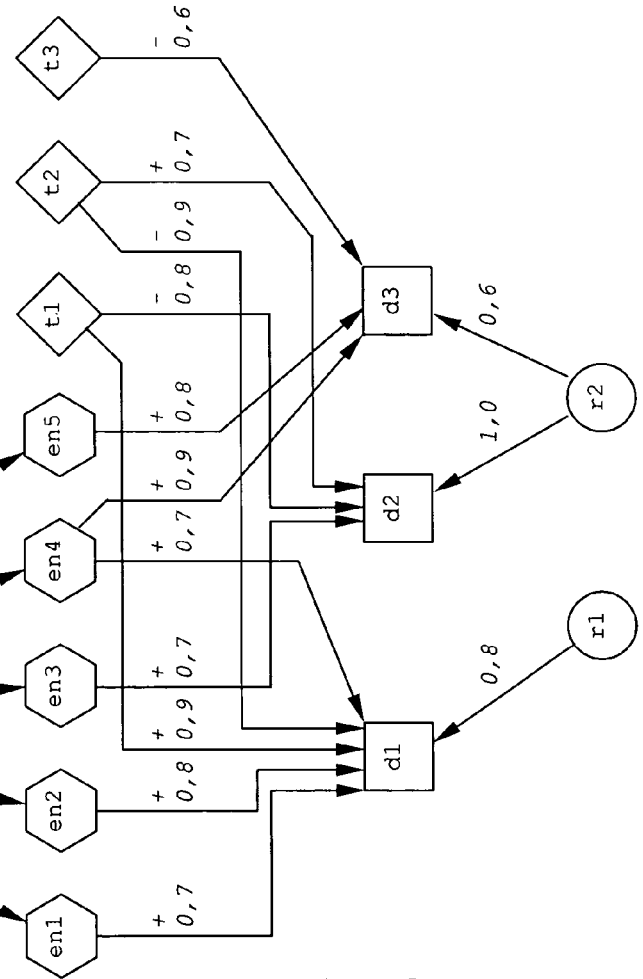
FIG. 4 is a block diagram illustrating the assignment of probabilities related to event sequences, diagnoses, tests, and repair actions.

FIG. 4 shows an example of a model used. Assuming a Bayesian Network implementation, FIG. 4 illustrates, for example, that the event sequence en1 has a probability 0.7 of occurring when the diagnosis d1 is correct. Likewise, the event sequence en2 has a probability 0.8 of occurring when the diagnosis d1 is correct. For the diagnosis d1 being correct, the test t1 has a probability 0.9 when the test is positive and the test t2 has the probability 0.9 when the test is negative.

Likewise the repair action r1 is appropriate with a probability of 0.8 when the diagnosis d1 is correct. Some repair actions may be common for more than one diagnosis. Such a shared repair action is especially relevant in cases when a decisive diagnosis cannot be found, but when the candidate diagnoses have the same repair actions.

Figure 5:
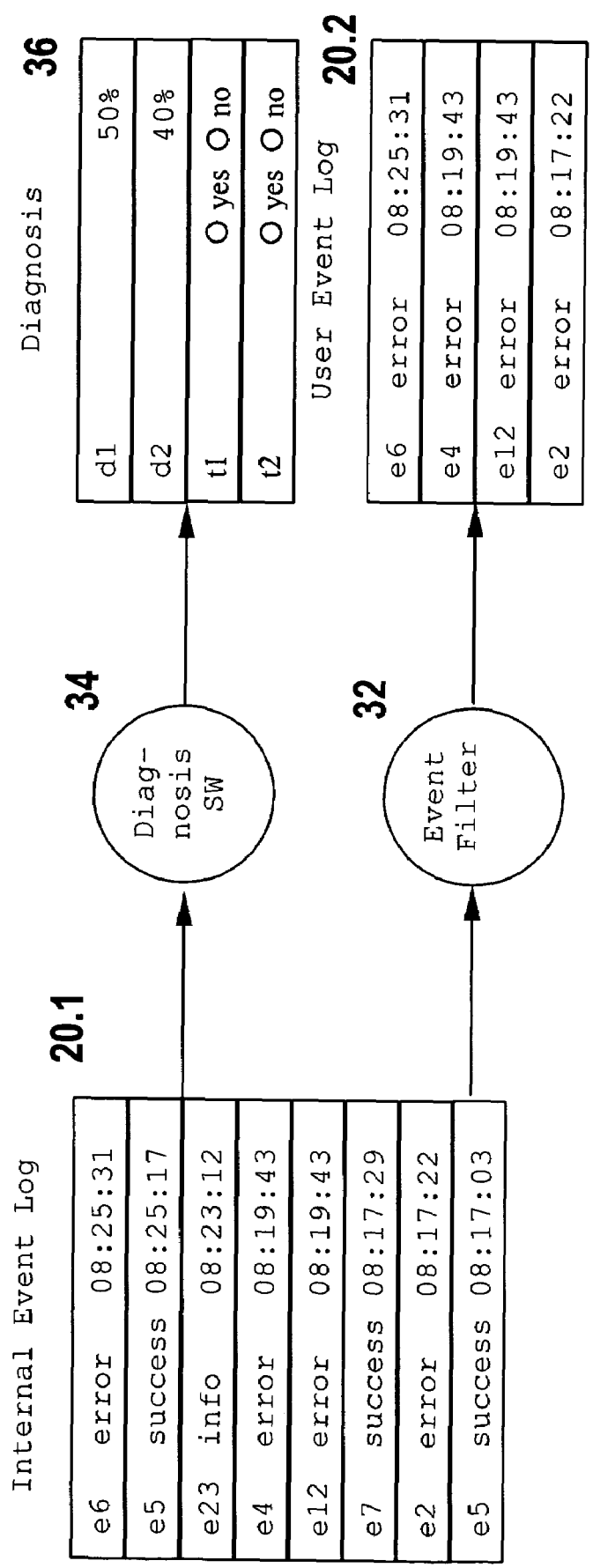
FIG. 5 is a block diagram illustrating the use of the event filter and diagnosis software, with a possible user display and query mechanism.

FIG. 5 shows a possible user interface that may be used. In addition to the User Event Log 20.2, a separate diagnosis table 36 is shown containing diagnostic messages d1, d2 with, possibly, the probability of a correct diagnosis, and manual tests t1, t2 that may be provided to enhance the probability of a correct diagnosis. The tests t1, t2 can, e.g., be answered direct in the table 36 by selecting the appropriate choice. The diagnosis table 36 may be updated when event sequence nodes change the value or when manual tests are answered.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptions will be readily apparent to those skilled in this art without departing from the spirit and scope of the present invention.

What is claimed is:

1. A method for isolating a hardware or user error and for providing a suitable repair action in a software controlled apparatus using recorded events and a causality model, that relates at least one root cause to at least one root cause related pattern of the events, comprising:
   relating at least one of the root cause related patterns with probability factors to more than one root cause;
   relating at least one repair action of the causality model that is related with probability factors to at least one of the root causes;
   recording a series of events;
   evaluating the series of events by comparing it with at least one of the root cause related patterns, thereby producing matched patterns;
   determining a best match of the matched patterns;
   isolating the root cause underlying the error by evaluating the probability factors; and
   suggesting at least one repair action based on the root cause related patterns, the root causes, and the probability factors.

2. The method as claimed in claim 1, wherein one of the root cause related patterns comprises events of the group consisting of error events, information events, and success events.

3. The method as claimed in claim 1, further comprising:
   obtaining user-provided additional information by interacting with a user; and
   utilizing the user-provided additional information in one of the root cause related patterns.

4. The method as claimed in claim 1, further comprising:
   obtaining test-provided additional information by testing the apparatus with test routines; and
   utilizing the test-provided additional information in one of the root cause related patterns.

5. The method as claimed in claim 1, wherein at least one of the repair actions is related with probability factors to more than one root causes.

6. The method as claimed in claim 1, wherein at least one of the root causes is related with probability factors to more than one repair action.

7. The method according to claim 1, further comprising: automatically executing the chosen repair action.

8. The method according to claim 1, further comprising: prompting the user to manually execute the chosen repair action.

9. The method as claimed in claim 1, further comprising: utilizing a Bayesian Network in order to determine a weighting of probability factors.

10. The method as claimed in claim 1, further comprising: utilizing an event filter to filter events for presentation to a user.

11. A system for isolating a hardware or user error and for providing a suitable repair action in a software controlled apparatus, comprising:

a memory comprising:
- an event log into which events of the apparatus are recorded;
- a table comprising a list of possible root causes for various problems or states;
- a table comprising repair actions; and
- a diagnosis module configured to implement, utilizing a processor, a causality model relating at least one root cause from the table with probability factors to at least one root cause related pattern of events by producing matched root cause related patterns to a series of events, determining a best match of the matched patterns, isolating the root cause underlying the error by evaluating the probability factors, and suggesting at least one repair action via an output, based on the root cause related patterns, the root causes and the probability factors.

12. The system according to claim 11, further comprising:
a Bayesian Network as a part of the diagnosis module configured to determine a weighting of probability factors.

13. The system according to claim 11, wherein the event log comprises:
- an internal event log; and
- a user event log;

the system further comprising:
an event filter that filters the internal event log to produce the user event log.

14. The system according to claim 11, further comprising:
automated repair modules configured to execute the repair actions.

* * * * *